United States Patent
Efraty

(10) Patent No.: US 10,960,355 B2
(45) Date of Patent: Mar. 30, 2021

(54) TWO-STAGE CLOSED CIRCUIT DESALINATION SYSTEM OF SUPER RO CHARACTERISTICS

(71) Applicant: DESALITECH LTD., Kfar Saba (IL)

(72) Inventor: Avi Efraty, Har Adar (IL)

(73) Assignee: DESALITECH LTD, Kfar Saba (IL)

( * ) Notice: Subject to any disclaimer, the term of this patent is extended or adjusted under 35 U.S.C. 154(b) by 0 days.

(21) Appl. No.: 16/647,511

(22) PCT Filed: Sep. 13, 2018

(86) PCT No.: PCT/IL2018/051033
§ 371 (c)(1),
(2) Date: Mar. 15, 2020

(87) PCT Pub. No.: WO2019/058364
PCT Pub. Date: Mar. 28, 2019

(65) Prior Publication Data
US 2020/0215485 A1 Jul. 9, 2020

(30) Foreign Application Priority Data
Sep. 25, 2017 (IL) .......................... 254724

(51) Int. Cl.
*B01D 61/02* (2006.01)
*B01D 61/08* (2006.01)
(Continued)

(52) U.S. Cl.
CPC ......... *B01D 61/022* (2013.01); *B01D 61/025* (2013.01); *B01D 61/08* (2013.01);
(Continued)

(58) Field of Classification Search
None
See application file for complete search history.

(56) References Cited

U.S. PATENT DOCUMENTS 6,001,244 A * 12/1999 Salter ................ B01D 65/02
210/104
2011/0315632 A1 12/2011 Freije
2013/0277310 A1 10/2013 Okeljas

FOREIGN PATENT DOCUMENTS

JP 2012192379 A1 10/2012

* cited by examiner

*Primary Examiner* — Richard C Gurtowski
(74) *Attorney, Agent, or Firm* — Soroker Agmon Nordman

(57) ABSTRACT

A inventive two-stage batch-CCD RO system includes two separate batch-CCD units of a different number of modules per stage with more modules in the first-stage—N(1)>N(2). A two-stage batch-CCD process proceeds when both units execute parallel fixed flow variable pressure desalination sequences of same operational set-points [flux, module recovery and batch sequence recovery (R)], with brine of a former first-stage used as second-stage feed. In two-stage batch CCD RO systems of high N(1)/N(2) ratio whereby the relative production of permeates of the two stages complies to: δ(1)>>δ(2), most of the permeates are produced in the first-stage under mild conditions and contribute to the low energy and salinity of permeates of the entire process. Compared with the performance of a single-stage batch-CCD RO unit, a two-stage system of the same module-number will render a performance of super RO characteristics, unmatched by any existing RO methods.

3 Claims, 5 Drawing Sheets

(51) Int. Cl.
  *B01D 61/12* (2006.01)
  *C02F 1/44* (2006.01)
  *C02F 103/06* (2006.01)
  *C02F 103/00* (2006.01)
(52) U.S. Cl.
  CPC .............. *B01D 61/12* (2013.01); *C02F 1/441* (2013.01); *B01D 2311/14* (2013.01); *B01D 2311/16* (2013.01); *B01D 2313/243* (2013.01); *B01D 2313/50* (2013.01); *B01D 2317/022* (2013.01); *C02F 2103/007* (2013.01); *C02F 2103/06* (2013.01); *C02F 2209/03* (2013.01); *C02F 2209/05* (2013.01); *C02F 2209/40* (2013.01); *C02F 2301/08* (2013.01)

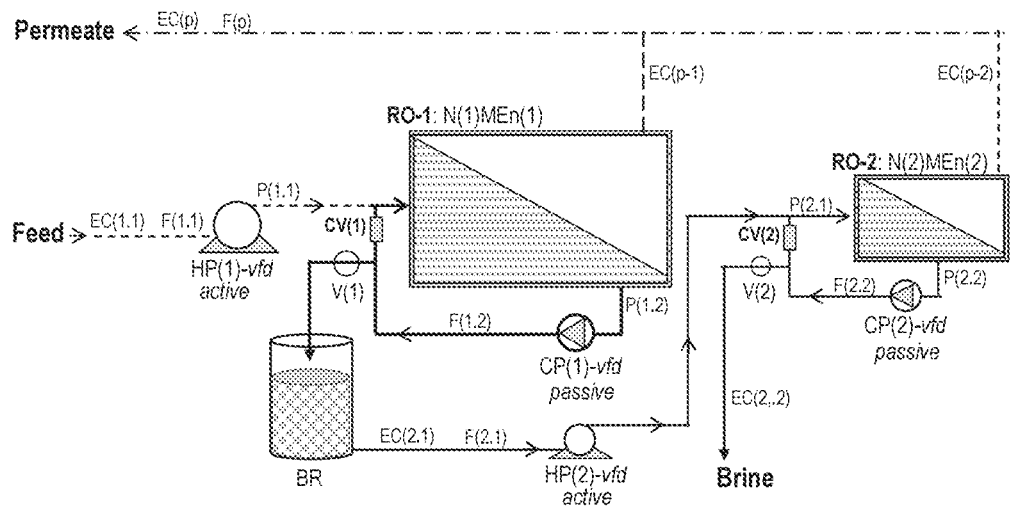
Fig. 1C
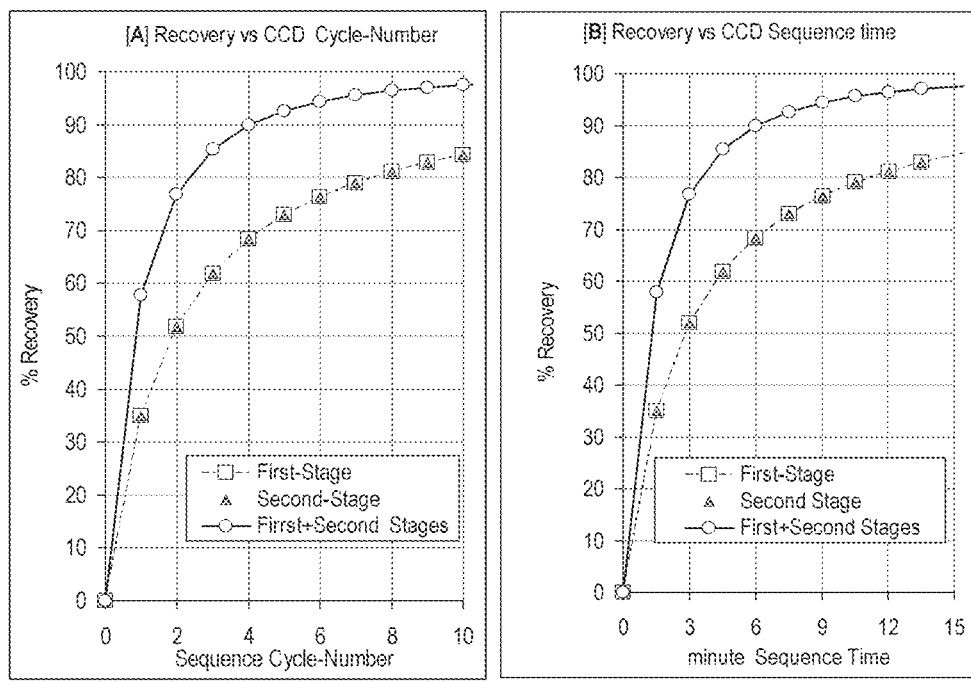
Fig. 2(A-B)

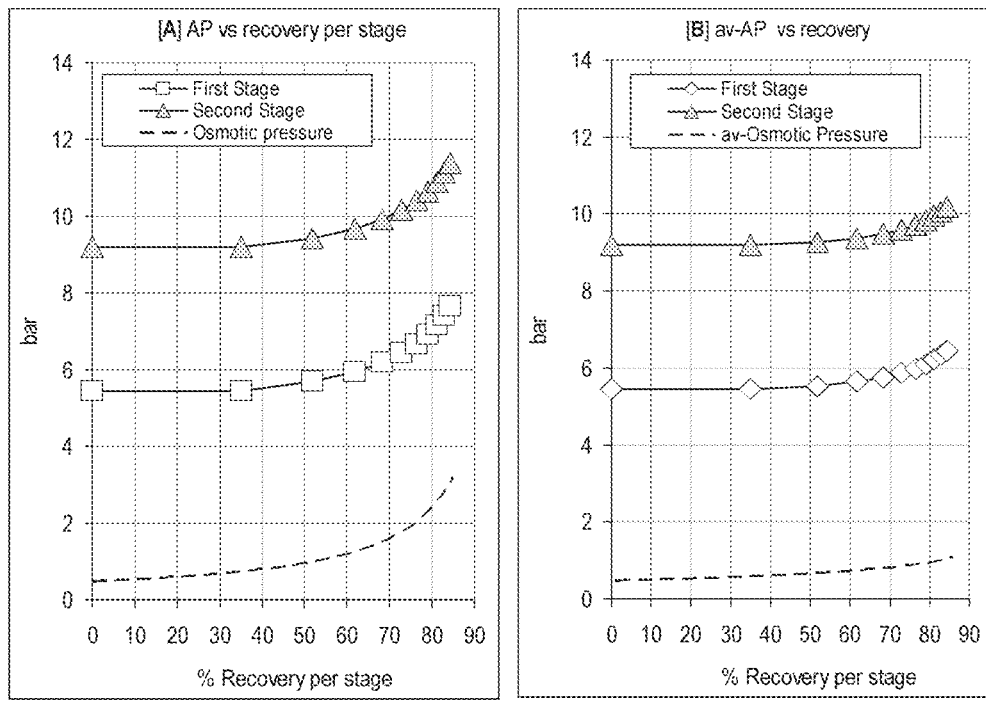
Fig. 3(A-B)
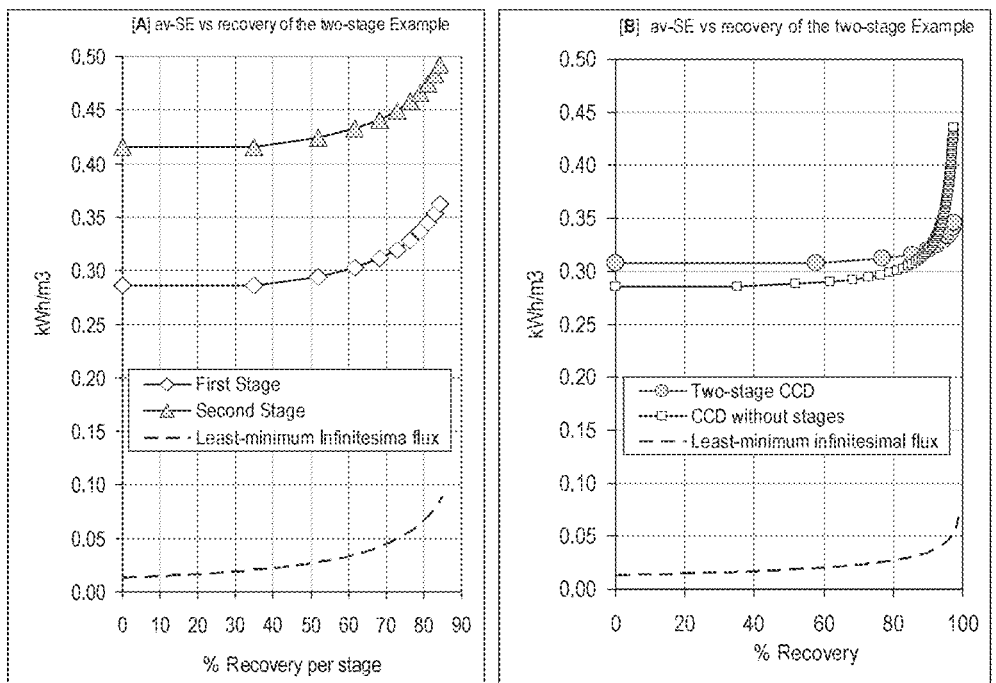
Fig. 4(A-B)

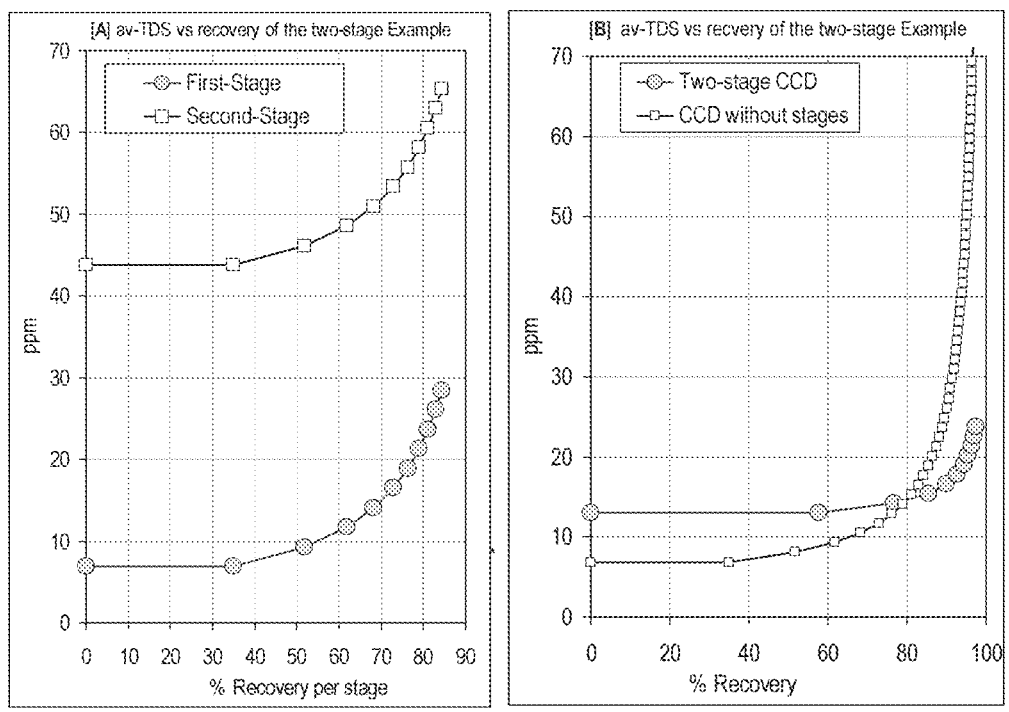
Fig. 5(A-B)
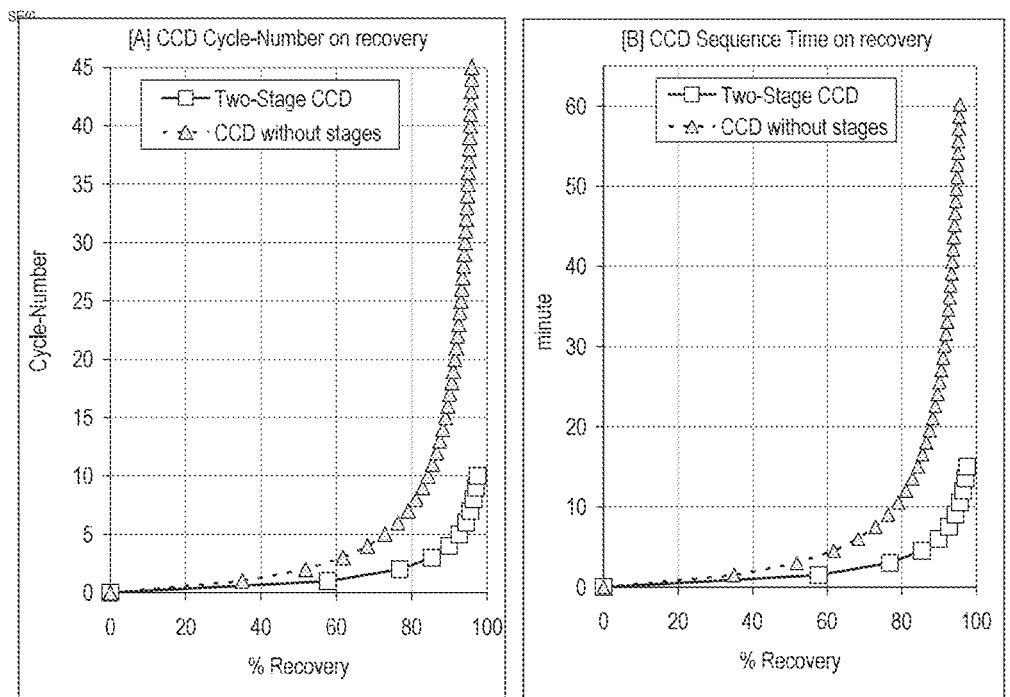
Fig. 6(A-B)

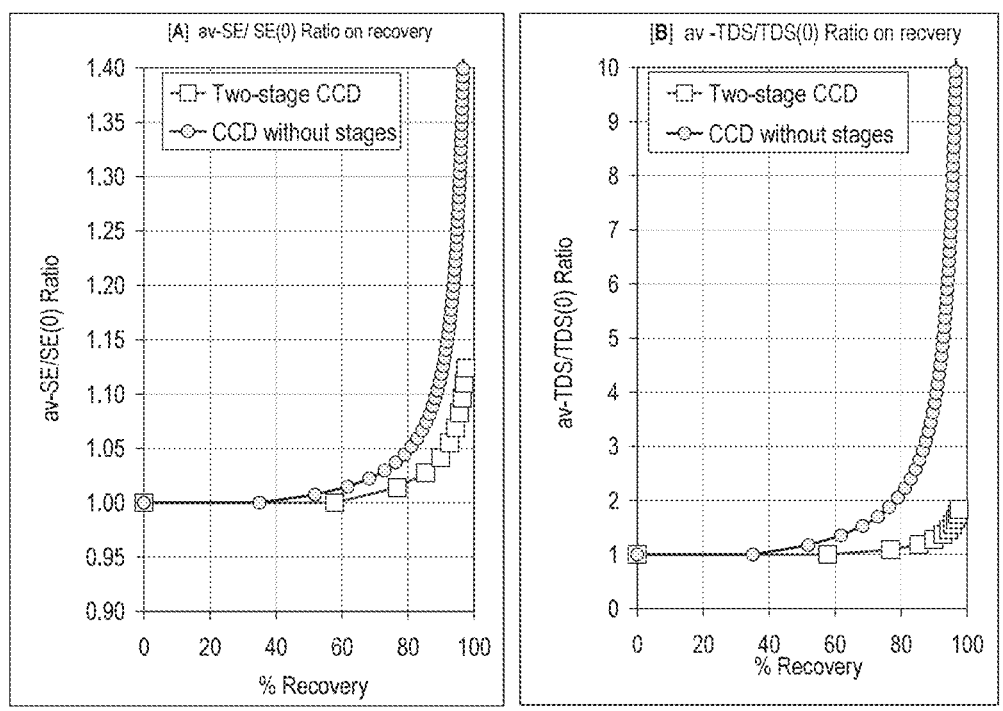
Fig. 7(A-B)

TWO-STAGE CLOSED CIRCUIT DESALINATION SYSTEM OF SUPER RO CHARACTERISTICS variable pressure conditions [PCT/IL2005/000670 (Efraty), "CONTINUOUS CLOSED CIRCUIT DESALINATION APPARATUS WITHOUT CONTAINERS", and PCT/IL20041000748 (Efraty) "APPARATUS FOR CONTINOUS CLOSED CIRCUIT DESALINATION UNDER VARIABLE PRESSURE WITH A SINGLE CONTAINER"] opened the door to new class of low energy high recovery batch desalination processes which can be made continued on a consecutive sequential basis. CCD proceeds sequentially with a complete concentrate recycling by a circulation pump (CP) means from outlet to inlet of modules where recycled concentrates are continuously diluted with a pressurized feed flow created by a high pressure pump (HP) means. CCD operation proceeds under fixed flow and variable pressure conditions with selected flow rates of pressurized feed ($Q_{HP}$) and recycled concentrates ($Q_{CP}$) and with same flow rates of permeate ($Q_P$) and pressurized feed ($Q_{HP}$). In batch CCD-RO, flux remains constant and defined by the selected $Q_{HP}(=Q_P)$, module recovery (MR) expressed by (1) and defined by the selected flow rates, sequence recovery (R) expressed by (2) from the cumulative volume of permeates ($\Sigma V_P$), or pressurized feed ($\Sigma V_{HP}$), and the fixed intrinsic volume of the closed circuit volume ($V_i$), and the pressure increase during the a batch sequence proceeds under fixed flux and net driving pressure (NDP) conditions by cycles of a fixed time duration (T) expressed by (3). The specific energy per cycle φ of HP[$SE_{HP}(\varphi)$] and CP[$SE_{CP}(\varphi)$] are expressed by (4) and (5) respectively, with overall per cycle expressed by their sum; wherein, p(φ) stands for the applied pressure per cycle φ, Δp for the unchanged pressure difference along modules, and eff for the efficiency ratio of the cited pumps. The TDS(φ) of permeates per cycle (φ) at 25° C. is expresses by (6); wherein, B stands for the salt diffusion coefficient, μ for flux, C(φ) for average salinity of the recycled concentrate during cycle φ, and av-pf for the average concentration polarization factor as defined from the average element recovery (AER) for a module of a defined element-number (EN) according to (7) and (8).

SUMMARY OF THE INVENTION $$MR = 100*Q_{HP}/(Q_{HP}+Q_{CP}) = 100*Q_P/(Q_P+Q_{CP}) \quad (1)$$

$$R = 100*\Sigma V_P/(\Sigma V_P+V_i) = 100*\Sigma V_{HP}/(\Sigma V_{HP}+V_i) \quad (2)$$

$$T = V_i/Q_{CP} \quad (3)$$

$$SE_{HP}(\varphi) = [Q_{HP}/Q_P]*p(\varphi)/36/\text{eff}_{HP} = p(\varphi)/36/\text{eff}_{HP} \quad (4)$$

$$SE_{CP}((\varphi) = [Q_{CP}/Q_P]*\Delta p/36/\text{eff}_{CP} \quad (5)$$

$$TDS((\theta) = [B/\mu]*C((\varphi)*\text{av-pf} \quad (6)$$

$$AER = 1 - [1 - MR/100]^{1/EN} \quad (7)$$

$$\text{av-pf} = 10^{0.7*AER/100} \quad (8)$$

Batch CCD RO enables reaching the ultimate recovery ($R_{max}$) level of a defined feed source pending its scaling constituents limitations and pressure rating of apparatus components and this is achieved by a sequence of identical $\varphi_{max}$ cycles over a sequence period of $\varphi_{max}*T = T_{max}*V_i/Q_{CP}$ with av-SE and av-TDS of permeates express the average of all the cycles $\varphi_{max}$ in the sequence and a permeate production volume per sequence expressed by $V_i/(1-R_{max}/100)$, or for example $20*V_i$ if R=95%. In the absence of pressurized brine release, CCD-RO proceeds with a near absolute energy conversion efficiency without need of energy recovery with av-SE determined primarily by the flux, efficiency of pumps, and the cycle-number ($\varphi_R$) required to reach a designated set-point recovery (R).

In contrast with batch CCD-RO, continuous multi-stage plug flow desalination (MS-PFD) techniques of extensive worldwide commercial practice are based on a declined number of modules per stage concomitant with a declined permeate production rate per stage which translates to a declined weight of $SE_{stage}$ and $TDS_{stage}$ on the respective overall av-SE and av-TDS of permeates. However, two-stage and three-stage conventional PFD systems with modules of six elements each are confined in their recovery by the recommend performance specifications of the elements by their manufactures, such that a two-stage MS-PFD system is confined to the recovery range 75%-80% and that of a three-stage system to 87%-90%. Moreover, said MS-PFD systems require booster pumps and energy recovery means (e.g., pressure exchanger means such as PX, DWEER, Turbo-charger, etc.) to enable high energy efficiency and such means are not needed with CCD-RO. Accordingly, RO-CCD is not confined to 90% recovery and its energy efficiency retained very high irrespective of recovery, well above the energy efficiency of MS-PFD processes.

The theoretical energy aspects of batch-CCD RO received a growing attention in recent years starting with the a model comparison between direct-pass multiple-stage RO and that of a semi-batch CCD RO which revealed that "closed circuit RO is a more practical/economical approach for energy lowering" than the former pathway [Lin et al., Desalination 366 (2015) 9-14.]. A further energy decrease in a CCD process was proposed for a batch-CCD design with a variable-volume high pressure tank installed in the closed circuit line of recycled concentrates [Warsinger et al., Water Research 106 (2016) 272-282. and Werber et al., Desalination 402 (2017) 109-122.] and a different approach of similar results was proposed on the basis of a batch-CCD design with a bladder inside the RO pressure-vessel which expands when provided with pressurized permeates [Warsinger et al., USA Provisional Patent Application (2016)]. The proposed low energy batch-CCD RO processes cited above are of little practical use in light of their design complexities compared with the ordinary batch-CCD apparatus for consecutive sequential desalination. Accordingly, the need for more practical/economical CCD systems of higher performance characteristics especially in the upper recovery range (>90%) still exists.

The present patent application describes a simple and practical two-stage CCD system of "super RO" performance characteristics unmatched by any of the traditional RO methods.

The inventive two-stage CCD system comprises a first-stage of N(1) modules for batch sequence R(1) recovery of feed and a second-stage of N(2) modules for batch sequence R(2) recovery of brine created in former sequences, with both stages carried out in parallel under fixed flow and variable pressure conditions of same sequence time duration and brine replacement steps. The performance results of inventive two-stage CCD system depend on the N(1)/N(2) modules ratio (η); the element-number per module per stage; and the operational set-points of flux (μ), module recovery (MR), and sequence recovery (R) of each stage. In general, a two-stage CCD system of identical modules and same operational set-points [flux, module recovery (MR), and sequence recovery (R)] in both stages, will generate permeates of higher quality at lower specific energy as function of an increased module ratio which manifests a declined fraction of permeates from the second stage {N(2)/[N(1)+N(2)]}. The benefits of the inventive two-stage CCD system are best illustrated by two-stage systems [N(1)] MEn–N(2)]MEn] of identical modules [MEn, stands for a module of n identical elements (E)] of different ratio-numbers (η) which under fixed flow and variable pressure conditions of same operational set-points (μ, MR and R) of both stages will enable an overall system recovery ($R_S$) expressed by $R_S=[1-(1-R/100)^2]$ with permeates fraction of second-stage as function of η (in parenthesis) expressed by 0.50(1); 0.33(2); 0.25(3); 0.20 (4) and 0.17(5) with cited ratio also expressing the contribution of the second-stage to the average specific energy (av-SE) and salinity of permeates (av-TDS) of the entire two-stage process. A simple 5ME5-ME5 two-stage CCD system configuration of the inventive system with identical modules operated with 35% MR (8.25% average element recovery and 1.142 av-pf) and 84.3% sequence recovery per stage, will proceed by an overall recovery ($R_S$) of 97.5% with 83.4% of the permeates produced in the first-stage and only 16.6% in the second-stage, both stages proceed with 84.3% recovery and 10 CCD cycles per sequence, with average specific energy and quality of permeates for the entire process expressed by the av-SE=0.835*SE(1)+0.166*SE(2) and av-TDS=0.835*TDS(1)+0.166*TDS(2), respectively, wherein the contribution of the second stage is relatively small.

According to some embodiments, a two-stage closed circuit desalination (CCD) system of two simultaneously operated CCD units under fixed flow and variable pressure conditions with brief brine flush-out steps between said sequences wherein, the non-pressurized brine of the first-stage stored in a brine reservoir (BR) serves as feed of the second-stage, comprises:

a first-stage CCD unit for R(1) sequential recovery of N(1) modules, each of n(1) elements, with inlets and outlets of said modules connected in parallel to a closed circuit concentrate recycling line with a circulation means [CP(1)]; a feed line with pressurizing means [HP(1)] which merges with said concentrate recycling line at inlet to modules and thereby causing a dilution effect; a permeate release line off said first-stage modules; and a line off said concentrate recycling line with an actuated valve means [V(1)] for brief brine flush-out at low pressure from the first-stage modules into said BR after each said sequential recovery completed;

a second-stage CCD unit for R(2) sequential recovery of N(2) modules [N(2)<N(1)], each of n(2) elements, with inlets and outlets of said modules connected in parallel to a closed circuit concentrate recycling line with a circulation means [CP(2)]; a first-pass brine line from said BR with pressurizing means [HP(2)] which merges with said concentrate recycling line at inlet to modules thereby causing a dilution effect; a permeate release line off second-stage modules; and a line off said concentrate recycling line with an actuated valve means [V(2)] for brief brine flush-out at low pressure from the second-stage modules after each said sequential recovery completed;

online monitoring means connected to a control board comprising flow/volume meters on inlet lines to said stages [F(1.1) and F(2.1)] to enable the fixed-flow operation of said pressurizing means through their variable frequency drive (vfd) control means and provide the required online flow rates and delivered volumes per each said stage; flow/volume meters on said recycled concentrate lines in said stages [F(1.2) and F(2.2)] to enable the fixed-flow operation of said circulation means through their variable frequency drive (vfd) control means and provide online data of flow rates and volumes of displaced brine during the flush-out steps of relevance to the recovery control of each of the said stages; pressure monitoring means at inlet and outlet to skids in each said stage [P(1.1), P(1.2) P(2.1), P(2.2)] to enable a follow-up of the variable pressure progression and module pressure-difference during said CCD sequence in each said stage and to control of the brine flush-out desired low pressure in each said stage; electric conductivity means on inlet lines to said stages [EC(1.2) and EC(2.1)], and on permeates' outlet lines off first-stage [EC(p–1)], second-stage [EC(p–2)] and overall blend [EC(p)]; and online control board with its fixed operational set-points of flux, module recovery (MR) and sequence recovery (R) per stage in the two-stage process dictates the followings—the parallel operation of the CCD sequences and brief brine flush-out steps between said sequences of the two-stage process; triggers through signals to the respective actuated valve means [V(1) for first-stage and V(2) for second-stage] the termination of CCD sequences and initiation the brine flush-out steps in both said stages simultaneously when the recovery set-point of first-stage [R(1) and the second-stage [R(2) are reached as well as the termination of said brine flush out-steps and resumption of said CCD sequences in each said stage when the monitored volume of replaced brine in the respective stages [F(1.2) for first-stage and F(2.2) for second-stage] complies with their respective intrinsic volumes requirements; triggers the activation/deactivation of the circulation pumps in said stages [CP(1) for first-stage and CP(2) for second-stage] when the CCD sequences in said stage are activated/deactivated, respectively;

wherein information stored in the control board regarding design features, online monitored data and operational set points dictate the simultaneous operation of both stages with said CCD sequences and said brine flush-out steps experienced in parallel over the same respective time duration, with said CCD sequences experienced most of the time (≥90%) and brief brine flush-out steps executed between said sequences with feed water volume used in the first-stage amounting to sum of the intrinsic volumes of both stage in order to enable an uninterrupted continuous operation of the entire two-stage CCD system.

According to some embodiments, the pressurizing means of both said stage [HP(1)] and HP(2)] are high pressure pumps with variable frequency drive means for controlled flow rates.

According to some embodiments, the circulation means of both said stages [CP(1)] and CP(2)] are circulation pumps with variable frequency drive means for controlled flow rates.

According to some embodiments, all modules in said system are identical and operated with the same flow rates per module by the same operational set-points of flux, module recovery [MR=MR(1)=MR(2)] and recovery R=[R(1)=R(2)] of same CCD cycle-number, cycle-time and sequence duration of an overall recovery expressed by $[1-(1-R/100)^2]*100$ such as 87.5% (R=65%), 91.0 (R=70%), 93.75% (R=75%), 96% (R=80) and 97.75

(R=85%); with permeates production ratio of said first-stage expressed by N(1)/[N(1)+N(2)] and that of said second-stage by N(2)/[N(1)+N(2)]; with said permeate ratio per stage also expressing its relative contributions to the overall average specific energy and the average total dissolved salt (TDS) of permeates of the entire two-stage process.

According to some embodiments, an increased modules' ratio [N(1)/N(2)] affects the production of lower salinity permeates with lower energy requirements.

According to some embodiments, modules of a larger element-number enable the selection of a higher MR of a lower concentration polarization factor and thereby allow CCD sequences of a smaller cycle-number per designated said set-point recovery with cited trend of increased MR implying declined average specific energy and salinity of permeates.

According to some embodiments, the first and second stages comprise modules of a different element-type and/or element-number [n(1)≠n(2)] which are operated by different operational set-points of flux [μ(1)≠μ(2)], module recovery [MR(1)≠MR(2)] and recovery [R(1)≠R(2)] of same CCD sequential periods and brief duration brine flush-out steps between said sequences, such that the two said stages proceed continuously in parallel with an overall recovery expressed by {1−[1−R(1)/100]*[1−R(2)/100]}*100 with preference given to a first-stage of higher flux [μ(1)>μ(2)] and recovery [R(1)>R(2)] in order to enable milder conditions in second-stage in light of expected increased fouling and scaling propensity; with permeates production ratio of said first-stage expressed by N(1)*V(1)/[N(1)*V(1)+N(2)*V(2)] and of second-stage by N(2)*V(2)/[N(1)*V(1)+N(2)*V(2)]; wherein, V stands for volume of product permeate per module per sequence per stage; and said permeate production ratio per stage also expressing also expressing its relative contribution to the overall average specific energy and the average total salinity of produced permeates.

According to some embodiments, the staged modules ratio is [N(1)/N(2)] of 4.0 or 5.0; for recovery of 75%-85% per stage; applied for high recovery low energy production of low salinity permeates from one of the following feed (<0.5%) sources: surface water, ground water, brackish water, domestic water supplies, treated domestic effluents, or treated industrial effluents.

According to some embodiments, two-stage closed circuit desalination (CCD) system of two simultaneously operated CCD units provides better quality permeates at high recovery with lower energy requirements than that of a single-staged CCD unit design under the same operational set-points conditions with the same feed source.

BRIEF DESCRIPTION OF THE DRAWINGS

FIG. 1C, showing the schematic design of a two-stage batch CCD system configuration near the end of its brine replacement by feed mode.

FIG. 2A, showing the relationship of recovery to sequence cycle-number in the Example of a two-stage batch CCD system of 5ME5-ME5 configuration.

FIG. 2B, showing the relationship of recovery to sequence time in the Example of a two-stage batch CCD system of 5ME5-ME5 configuration.

FIG. 3A, showing the relationship of recovery to applied pressure in the Example of a two-stage batch CCD system of 5ME5-ME5 configuration.

FIG. 3B, showing the relationship of recovery to average applied pressure in the Example of a two-stage batch CCD system of 5ME5-ME5 configuration.

FIG. 4A, showing the relationship of recovery to specific energy per stage in the Example of a two-stage batch CCD system of 5ME5-ME5 configuration.

FIG. 4B, showing the relationship of recovery to the overall specific energy in the Example of a two-stage batch CCD system of 5ME5-ME5 configuration.

FIG. 5A, showing the relationship of recovery to TDS of permeates per stage in the Example of a two-stage batch CCD system of 5ME5-ME5 configuration.

FIG. 5B, showing the relationship of recovery to the overall TDS of permeates in the Example of a two-stage batch CCD system of 5ME5-ME5 configuration.

FIG. 6A, showing the relationship of cycle-number to recovery in the Example of a two-stage batch CCD system of 5ME5-ME5 configuration compared with that of a single-stage 6ME5 CCD system of identical modules.

FIG. 6B, showing the relationship of sequence time to recovery in the Example of a two-stage batch CCD system of 5ME5-ME5 configuration compared with that of a single-stage 6ME5 CCD system of identical modules.

FIG. 7A, showing the relationship of relative specific energy to recovery in the Example of a two-stage batch CCD system of 5ME5-ME5 configuration compared with that of a single-stage 6ME5 CCD system of identical modules.

FIG. 7B, showing the relationship of relative TDS of permeates to recovery in the Example of a two-stage batch CCD system of 5ME5-ME5 configuration compared with that of a single-stage 6ME5 CCD system of identical modules.

DETAILED DESCRIPTION OF THE INVENTION

Figure 1A:
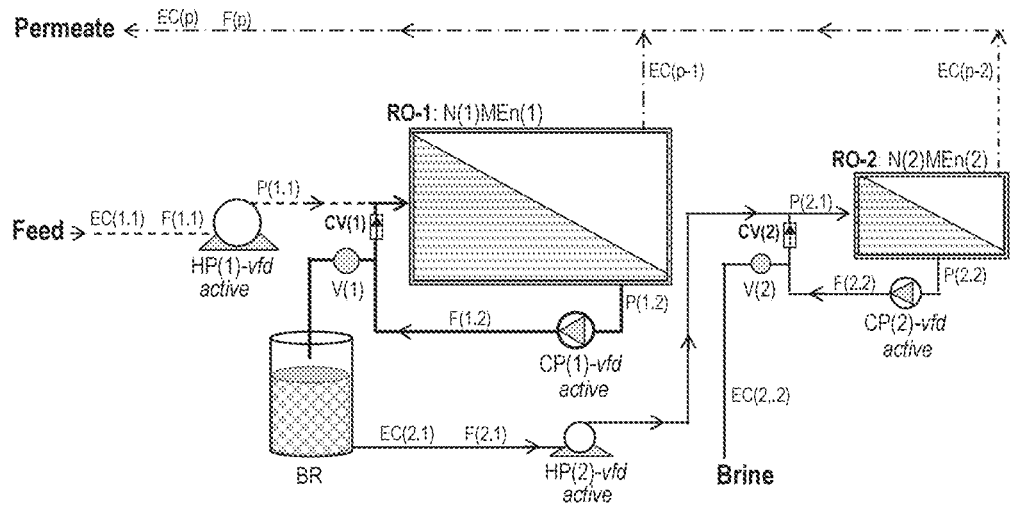
FIG. 1A, showing the schematic design of a two-stage batch CCD system configuration during its RO desalination mode.

Consecutive sequential CCD in a fixed closed circuit intrinsic volume design under fixed flow and variable pressure conditions proceeds by identical CCD cycles ($\varphi$) of fixed flow rates and time duration expressed by (9), each of a defined applied pressure and salinity of recycled concentrate, with a linear permeates production on the time scale and exponential on the recovery scale expressed by (2). During the sequence progression, the specific energy per cycle is expressed by (4) for HP, by (5) for CP and the salinity of permeate per cycle expressed by (5). The specific energy and salinity of permeates in a CCD sequence relate to the cycle-number and their sequence average (av-SE and av-TDS) on recovery rises as function of the exponentially increase cycle-number with recovery. According to (9), the cycle-number ($\varphi$) is a function of MR and R, both operational set-points in CCD processes, of a sharp fast exponential rise beyond a certain batch recovery level of around 85%-90% for ordinary brackish water sources. The choice of MR as a sep-point depends on the module selection (MEn) and its EN and AER parameters according to (7) for a sufficiently low average concentration polarization factor (av-pf) according to (8). In general, a sharp exponential rise of $\varphi$ on recovery become increasingly significant above 90% recovery this drawback of the single stage CCD technology for high recovery desalination (90%→98%) is removed by the inventive two-stage CCD technology described hereinafter.

$$\varphi=(R/MR)*[(100-MR)/(100-R)] \qquad (9)$$

The inventive two-stage CCD system of the preferred embodiment according to the schematic design displayed in FIG. 1(A-C) comprises two CCD units with a first-stage module-number greater than that of the second-stage [N(1)>N(2)] and modules of same element-number [n(1)=n(2)], or of a different element-number [n(1)≠n(2)]; wherein, the collected depressurized brine of the first-stage in a brine reservoir (BR) serves as a second-stage feed. and the entire said system made to run continuously through its flow/volume control means and its programmable logic controller (plc) board, such that both stages proceed simultaneously with their with their CCD sequences and brine flush out steps experienced in parallel over the same time duration with recovery per stage, either identical or not, maintained in the 70%-85% with an overall recovery ($R_C$) expressed by (10) for [R(1)=R(2)=R] and by (11) for [R(1)≠R(2)].

$$R_C=[1-(1-R/100)^2]*100 \quad (10)$$

$$R_C=\{1-R(1)/100]*[1-R(2)/100]\}*100 \quad (11)$$

Each stage in the inventive system comprises the typical CCD design features displayed schematically in FIG. 1(A-C) of a RO skid made of modules and elements; pumps (HP and CP); valves means (V and CV); conducting lines of feed, permeate, recycled concentrate, and brine flush out extension off closed circuit; and monitoring means of flow/volume (F), pressure (P) and electric conductivity (EC), with emphasis on the actuation configurations during CCD sequences (A), brine flush out modes at start (B) and near completion (C) just before resumption of CCD. CCD (A) of both stages simultaneously and in parallel, with CCD sequences experienced most of the time (>90%) and brief brine flush-out steps between CCD sequences carried out with an accelerated feed flow rate at inlet to the first-stage.

The online monitoring means of the inventive two-stage CCD system of the preferred embodiment according to the schematic design displayed in FIG. 1(A-C) comprise of the following: Flow/volume meters on inlet lines to said stages [F(1.1) and F(2.1)] to enable the fixed-flow variable pressure operation of the pressurizing pumps [HP(1) and HP(2)] through their variable frequency drive (vfd) control means, and said flow/volume meters also provide delivered volume data in each said stage. Flow/volume meters in the recycled concentrate lines in said stages [F(1.2) and F(2.2)] to enable the fixed-flow constant pressure ($\Delta p$) operation of the circulation pumps [CP(1) and CP(2)] through their variable frequency drive (vfd) control means and said flow/volume meters also provide the displaced volume data during the brine flush-out steps in the said stages. Flow/volume meter of combined permeates F(p). Pressure monitoring means at inlet and outlet of RO skid in each said stage [P(1.1), P(1.2) P(2.1), P(2.2)] to enable a follow-up of the variable pressure progression and module pressure-difference ($\Delta p$) during said CCD sequence in each said stage, and to control of the brine flush desired low pressure in each said stage through the partial opening of the actuated valve means [[V(1) and V(2)]. Electric conductivity monitoring means of feed at inlet to said stages [EC(1.2) and EC(2.1)], permeates of the first-stage [EC(p-1)] and the second-stage [EC(p-2)] and overall blend of both [EC(p)].

The plc board, with its operational set-points data and online monitored information, navigates the entire operation of the inventive two-stage CCD system of the preferred embodiment according to the schematic design in FIG. 1(A-C) as followed: The CCD sequence in each said stage proceeds according to its selected operational set-points of flux ($\mu$), module recovery (MR) and sequence recovery (R); wherein, flux correlates to flow rates according to expression (12), recycled flow rate per stage ($Q_{CP}$) correlates to MR and flux ($\mu$) according to expression (13), and R correlates to intrinsic closed circuit volume and cumulative volume of permeates, same as the cumulative volume of pressurized feed, according to expression (2); wherein, N stands for the number of module per stage, n for the number of elements per module and SE for the membrane surface per element.

$$Q_P=Q_{HP}=\mu*N*n*S_E \quad (12)$$

$$Q_{CP}=[(100-MR)/MR]*Q_P=[(100-MR)/MR]*\mu*N*n*S_E \quad (13)$$

The different accelerated feed flow rate set-points during the brine flush-out steps in both stages are selected to enable the completion of said process in both stages simultaneously over the same time duration, and thereafter, to enable the resumption of the CCD sequences in both stages at the same time.

Figure 1B:
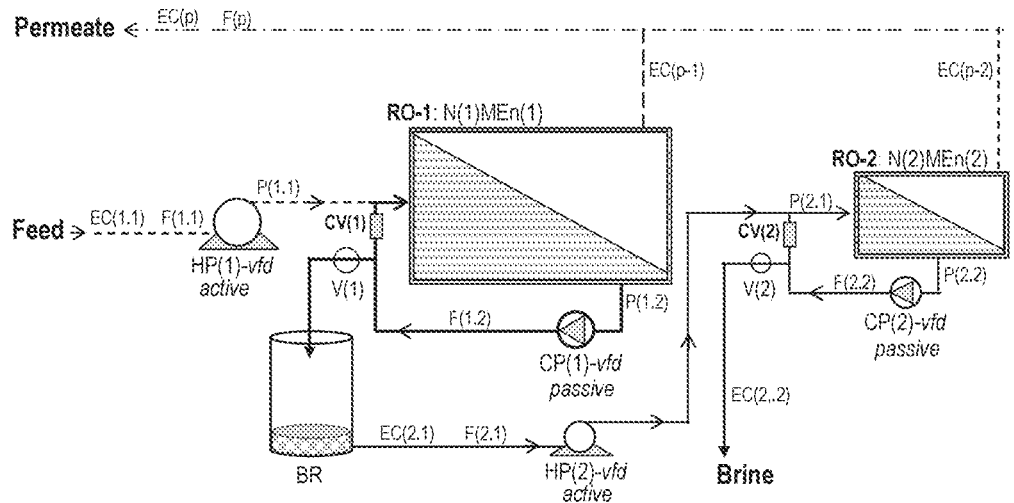
FIG. 1B, showing the schematic design of a two-stage batch CCD system configuration at start of its brine replacement by feed mode.

The application of the above cited operational set-points and online monitored data to the continuous actuation the inventive two-stage CCD system of the preferred embodiment according to the schematic design in FIG. 1(A-C) proceeds as followed: When the displaced brine volume in the first-stage, monitored on F(1.2), reaches the combined intrinsic close circuit volume of both stages, a control board signal will trigger the termination of the flush-out steps (FIG. 3C) and the resumption of CCD sequences (FIG. 1A) in both stages simultaneously. Termination of the CCD sequence in the first-stage by a volumetric signal from F(1.1), manifested the attainment of the recovery set-point [R(1)] as expressed by (2), will also trigger the termination of CCD sequence in the second-stage and the start of the brine flush-out steps (FIG. 1B) in both stages simultaneously. Configuration changes in the two-stage CCD system [FIG. 1(A-C)] during its continuous operation are manifested by the valve means [V(1) and V(2) positions, mode of CP (active/passive), and flow direction in conducting lines.

The most effective RO skid configurations for the inventive two-stage CCD system of the preferred embodiment according to the schematic design in FIG. 1(A-C) should consist of the highest N(1)/N(2) module-number ratio, with a MR set-point selection of the lowest CCD sequence cycle-number per stage, and recovery set-point selections per stage (R) of 70%≤R≤85%. Cited conditions are best met for the modules ratio 4 and 5 with each module comprising 4 or 5 elements. Permeate volume production per sequence ($\Sigma V_P$) can be expressed by (14); wherein, $V_m$ stands for the intrinsic volume per module. When all the modules in the inventive two-stage CCD system of the preferred embodiment are identical and operated with the same operational set-points ($\mu$, MR and R), this will imply identical flow rates per module in said system irrespective of stage with a total sequential volume production of permeates [$\Sigma_P$(TOTAL)] expressed by (15) and fractions of said total expressed for the first-stage [$\delta(1)$] by (16) and for the second-stage [$\delta(2)$] by (17) with said fractions also determine the overall average specific energy [av-SE(TOTAL)] and average salinity of permeates [av-TDS(TOTAL)] of said two-stage CCD process, expressed by (18) and (19), respectively. In simple terms, a two-stage CCD system of N(1)/N(2)=5 configuration with identical modules of the same operational set-points ($\mu$, MR and R) will experience identical low cycle-number sequences in both sequences with overall recovery ($R_C$) expressed by (10), or 96% recovery if R(1)=R(2)=80%, with $\delta(1)$=5/6 and $\delta(2)$=1/6 which implies that 83.3% of av-SE(TOTAL) and av-TDS(TOTAL) of permeates arise from the first-stage and only 16.7% from the second-stage and such a performance translates to exceptionally high recovery of exceptionally low energy demand and salinity of permeates by a simple CCD system noted for its low fouling and scaling propensity without bio-fouling.

$$\Sigma V_P = N * V_m * [R/(100-R)] \quad (14)$$

$$\Sigma V_P(\text{TOTAL}) = \Sigma V_P(1) + \Sigma V_P(2) = [N(1)+N(2)] * V_m * P(100-R) \quad (15)$$

$$\delta(1) = N(1)/[N(1)+N(2))] \quad (16)$$

$$\delta(2) = N(2)/[N(1)+N(2))] \quad (17)$$

$$\text{av-SE(TOTAL)} = \delta(1) * [\text{av-SE}(1)] + \delta(2) * [\text{av-SE}(2)] \quad (18)$$

$$\text{av-TDS(TOTAL)} = \delta(1) * [\text{av-TDS}(1)] + \delta(2) * [\text{av-TDS}(2)] \quad (19)$$

The inventive two-stage CCD system of the preferred embodiment according to the schematic design in FIG. 1(A-C) may comprise first and second stages of different modules' element-type and/or element-number [n(1)≠n(2)] and proceed with different operational set-points [μ(1)≠μ(2); MR(1)≠MR(2) and R(1)≠R(2)] of parallel CCD sequential periods and brief brine flush-out steps between said sequences of same period duration. Under said conditions, the overall recovery of the inventive two-stage CCD system is expressed by (11) with a permeates volume production fraction ratio (8) of first and second stages expressed by (20) and (21), respectively, and dictating the average energy [av-SE(TOTAL)] and average salinity of permeates [av-TDS(TOTAL)] of the entire process.

$$\delta'(1) = N(1) * V'_m(1)/[N(1) * V'_m(1) + N(2) * V'_m(2)] \quad (20)$$

$$\delta'(2) = N(2) * V'_m(2)/[N(1) * V'_m(1) + N(2) * V'_m(2)] \quad (21)$$

It will be understood to the skilled in the art that the inventive two-stage CCD system of the preferred embodiment and its principle actuation modes described hereinabove on the basis of FIG. 1(A-C) are schematic and simplified and are not to be regarded as limiting the invention, but as an example of many for the diverse implementation of the invention. In practice, the inventive system may comprise many additional lines, branches, valves, and other installations and devices as deemed necessary according to specific requirements while still remaining within the scope of the invention's claims. The basic design and control principles of the two-stage CCD inventive system require the simultaneous actuation the two-stages during their respective CCD sequences and brine rejection modes under controlled flow rates with first-stage supplied with feed and second-stage of a lesser number of modules supplied with brine of a former first-stage origin through a brine reservoir, and the continuous operation of both stages simultaneously in the same recovery range independently produces considerable more permeates of higher quality at lower energy in the first-stage compared with the second-stage. The specified requirements of the inventive system could be met through flow control means even when both stages do not comprise identical modules of same element-number and element-type.

It should be apparent to the skilled in the art that the modules of both stages could be mounted on the same skid, exactly the way it is done in the skid design of traditional direct-pass two-stage systems, and that dosing means of antiscalant and/or of pH modifying solutions may be required at inlet to the first-pass and/or the second-pass depending on the nature of the supplied feed. It is further understood that the entire inventive system is operated through the same control board by means of set-points of flux, module recovery and sequence recovery during CCD sequences and set-points of accelerated flow rates at inlet to stages during their brine rejection mode. The operation of the inventive system may take place from the control panel placed on the system, or alternatively, through a remote control computer means, in response to online monitored data of flow rates; pressures; electric conductivity of feed, permeates and brine; and power consumption of pumps and their translations to specific energies per stage and overall. Scaling development in modules of the inventive system may be followed-up by increased monitored pressure difference and power consumption of the circulation means [CP(1)-vfd and CP(2)-vfd]; whereas, increased fouling of membrane surfaces under fixed-flux conditions is signified by the increased power consumption of the pressurizing pumps [HP(1)-vfd and HP(2)-vfd], increased maximum applied sequential pressure per stage, and changes of electric-conductivity of permeates. The second-stage of the inventive system operates with a higher feed concentration of greater expected propensity to scaling and fouling than that of the first-stage, and this may suggest in certain cases the need for a lower operational flux and more effective antiscalant dosing in the second compared with the first stage.

While the invention has been described hereinabove in respect to particular embodiments, it will be obvious to those versed in the art that changes and modifications may be made without departing from this invention in its broader aspects, therefore, the appended claims are to encompass within their scope all such changes and modifications as fall within the true spirit of the invention.

EXAMPLE

The projected performance of the two-stage CCD inventive system of the preferred embodiment [FIG. 1(A-C)] with a skid of five modules in the first-stage (5ME5) and one module (ME5) in the second-stag; wherein all modules are identical of five elements each, irrespective of stage, and comprise of the same ESPA2-MAX elements inside long pressure vessels each of five elements and three spacers to create a sufficient intrinsic volume per module (190 liter) and thereby enable long enough (>15 minute) CCD sequences. Both stages are operated with identical CCD set-points of 20 lmh flux (μ), 35% module recovery (MR) and 84.3% sequence recovery (R), and engaged simultaneously with identical CCD sequences (15 minute long, 10 CCD cycles per sequence, 1.505 minute per cycle, 102.3 liter permeate production per cycle per module, 8.25.2% av-element recovery, 1.142 av-concentration polarization factor (av-pf) and 1.5 bar pressure difference per module). The CCD operational set-points translate to the respective HP and CP flow rates per module of 4.08 and 7.58 m$^3$/h in both stages, or 20.4 and 37.9 m$^3$/h per first-stage and 4.08 and 7.58 m$^3$/h per second-stage, respectively. Removal of accumulated brine in the intrinsic volume of the first-stage (950 liter) and the second-stage (190 liter) after completion of their respective CCD sequences, with excess feed in the former (950+190=1,140 liter) to ensure complete brine rejection in the latter. Brine flush-out proceeds with flow rate set-points (m$^3$/h) of 34.2 [HP(1)] and 5.7 [[HP(2)] at 1.5 atm, without desalination, over a period of 2.0 minutes in both stages. The overall sequence duration accounting for both CCD (15 min) and brine rejection (2 min) amounts to 17 min and this implies that CCD is experienced 89.5% of the time. The combined CCD production of permeates in both stages amounts to 24.48 m$^3$/h, or effective production of 21.9 m$^3$/h and 525.6 m$^3$/day.

The Example of the two-stage 5ME5+ME5 CCD inventive system of the preferred embodiment is said for a 0.06% NaCl (600 ppm) feed source at 25° C. assuming 80% efficiency of pumps [HP(10), CP(1), HP(2) and CP(2)], and its performance is compared with that of a single-stage CCD unit of a 6ME5 CCD configuration of identical modules under the same operational set-points of same flow rates per module. The intent of the feed salinity selection has been to illustrate the two-stage CCD inventive system in the context of treated domestic effluents desalination for reuse, a subject of a growing interest in recent years. The sequence of both stages proceed simultaneously with the same recovery (84.3%), cycle-number (10) and time duration (15 minute) as revealed in FIG. 2A and FIG. 2B, respectively, with an overall recovery of 97.5% of the two-stage process. Sequential applied pressure (AP) increase on recovery during the first and second stages of the exemplified process are displayed in FIG. 3A with a curve of osmotic pressure of concentrates as reference, and the results manifest the conditions under which flow rates remain constant due to a fixed net driving pressure. The sequential average AP increase on recovery displayed in FIG. 3B together with the average osmotic pressure of concentrates, reveal the average specific energy (av-SE) components [(atm-m$^3$)/m$^3$)] of the pressurizing pumps [SE(kWh/m$^3$)=av-AP/36]. The av-SE on recovery curves of the first and second stages in FIG. 4A together with least-minimum under perfect infinitesimal flux as reference, reveal the energy demand of the separate stages. The combined energy demand of the exemplified two stage process on recovery, compared with that of the relevant single-stage process, are revealed in FIG. 4B and takes account of relative ⅚ and ⅙ respective contributions of the first and second stages to the overall. By analogy with the energy data presentation, the av-TDS of permeates on recovery of the first and second stages of the two-stage exemplified process are revealed in FIG. 5A and their overall in FIG. 5B as compared with that of a single-stage CCD process of the same overall recovery (97.5%).

The main differences between the performance of a two-stage CCD system and that of a single-stage CCD unit of the same number of identical modules and operational set-points are revealed in FIG. 6(AB) of recovery versus cycle-number (A) or sequence time duration (B). The ultimate recovery (97.5%) in the two-stage CCD Example under review is reached by 10 cycles in the separate stages (FIG. 2A) as well as by the combined two-stage process of the same 15 min. sequence time duration (FIG. 2B) 15 min.); whereas, such a single-stage process proceeds to the designated recovery (97.5%) by ~45 cycles (FIG. 6A) and a much longer ~60 min. sequence period (FIG. 6B). The increased CCD cycle effects with recovery on the normalized av-SE [av-SE/SE(o)] and av-TDS [av-TDS/TDS(o)] revealed in FIG. 7A and FIG. 7B, respectively, for the compared single-stage and two-stage processes carried out with identical modules and same operational set-points, show the clear preference of the latter process, that of the inventive system of the preferred embodiment, for high recovery desalination of low energy and salinity of permeate, unmatched by any of the existing RO methods.

The invention claimed is:

1. A method for desalination; said method comprising:
   (a) providing a multi-stage system comprising:
      (i) a brine reservoir (BR);
      (ii) a first-stage unit of N(1) modules, each of n(1) elements, with inlets and outlets of said modules connected in parallel to a closed circuit concentrate recycling line [F(1.2)] with a circulation pump having a variable frequency drive [CP(1)]; a feed line [F(1.1)] with a high-pressure pump having a variable frequency drive [HP(1)], wherein said feed line merges with said concentrate recycling line; a permeate release line; and a line off said concentrate recycling line with an actuated valve [V(1)] connected to said BR;
      (iii) a second-stage unit of N(2) modules, each of n(2) elements, with N(2)<N(1), with inlets and outlets of said modules connected in parallel to a closed circuit concentrate recycling line [F(2.2)] with a circulation pump having a variable frequency drive [CP(2)]; a brine inlet line [F(2.1)] from said BR with a high-pressure pump having a variable frequency drive [HP(2)], wherein said brine inlet line merges with said concentrate recycling line; a permeate release line; and a line off said concentrate recycling line with an actuated valve [V(2)] for removing brine from the second stage; and
      (iv) online monitoring means connected to a control board comprising flow meters to measure feed flow to the first-stage unit, brine flow into the second-stage unit, and flow within the recycling lines [F(1.2)] and [F(2.2)] to enable flow control through the variable frequency drives of pumps [CP(1), CP(2), HP(1), HP(2)]; and wherein information is stored in the control board regarding design features, online monitored data and operational set points to control the operation of both stages; and
   (b) using information accessible by the control board regarding design features, online monitored data and operational set points to control the variable frequency drive pumps [HP(1), HP(2), CP(1), CP(2)] and actuating valves [V(1), V(2)] of each stage to provide continuous closed-circuit desalination sequences interrupted by brine flush-out steps, wherein said desalination sequences occur over a time interval which is at least 90% of combined times for desalination sequences and brine flush-out steps; and said brine flush-out steps are executed between said desalination sequences.

2. The method of claim 1 further comprising measuring pressures in: (i) feed line [F(1.1)] after pump [HP(1)]; (ii) concentrate recycling line [F(1.2)] before pump [CP(1)]; (iii) brine inlet line [F(2.1)] after pump [HP(2)] and after the closed circuit concentrate recycling line [F(2.2)]; and (iv) closed circuit concentrate recycling line [F(2.2)] before the circulation pump having a variable frequency drive [CP(2)]; and sending pressure measurements to the control board.

3. The method of claim 1 further comprising measuring electrical conductivity in: (i) feed line [F(1.1)]; and (ii) brine inlet line [F(2.1)]; and sending conductivity measurements to the control board.

* * * * *